United States Patent
Futty

(10) Patent No.: US 9,407,655 B2
(45) Date of Patent: Aug. 2, 2016

(54) MONITORING SECURITY RISKS TO ENTERPRISE CORRESPONDING TO ACCESS RIGHTS AND ACCESS RISK CALCULATION

(71) Applicant: Bank of America Corporation, Charlotte, NC (US)

(72) Inventor: Michael E. Futty, Bridgeville, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/470,588

(22) Filed: Aug. 27, 2014

(65) Prior Publication Data

US 2016/0065608 A1    Mar. 3, 2016

(51) Int. Cl.
*G06F 12/14* (2006.01)
*G06F 12/16* (2006.01)
*H04L 29/06* (2006.01)

(52) U.S. Cl.
CPC ............ *H04L 63/1433* (2013.01); *H04L 63/10* (2013.01)

(58) Field of Classification Search
CPC .... G06F 21/577; H04L 63/1433; H04L 63/10
USPC ...................... 726/25, 23; 713/182
See application file for complete search history.

(56) References Cited

U.S. PATENT DOCUMENTS

| | | | |
|---|---|---|---|
| 8,050,997 B1 * | 11/2011 | Nosek et al. .................. 705/37 |
| 8,122,510 B2 * | 2/2012 | Byers et al. .................. 726/25 |
| 8,386,378 B2 * | 2/2013 | Halper et al. ................. 705/38 |
| 8,453,246 B2 * | 5/2013 | Lang et al. .................... 726/25 |
| 2006/0020814 A1 * | 1/2006 | Lieblich et al. .............. 713/182 |
| 2007/0288355 A1 * | 12/2007 | Roland et al. ................. 705/38 |
| 2010/0198660 A1 * | 8/2010 | Armstrong et al. ........... 705/11 |
| 2011/0231221 A1 * | 9/2011 | Worwetz .............. G06Q 10/06 705/7.28 |
| 2013/0144785 A1 * | 6/2013 | Karpenko et al. ............ 705/44 |
| 2013/0197963 A1 * | 8/2013 | Deb et al. .................... 705/7.28 |
| 2013/0218765 A1 * | 8/2013 | Hammad et al. .............. 705/41 |
| 2014/0025525 A1 * | 1/2014 | Frohwein et al. ........... 705/26.3 |
| 2014/0114962 A1 * | 4/2014 | Rosenburg et al. .......... 707/723 |
| 2014/0249883 A1 * | 9/2014 | Cicchitto et al. ............ 705/7.25 |
| 2014/0278730 A1 * | 9/2014 | Muhart et al. ............... 705/7.28 |
| 2015/0019262 A1 * | 1/2015 | Du et al. ........................ 705/4 |
| 2015/0101050 A1 * | 4/2015 | Nielson et al. ................ 726/23 |

* cited by examiner

*Primary Examiner* — Haresh N Patel
(74) *Attorney, Agent, or Firm* — Michael A. Springs

(57) ABSTRACT

A system comprising an interface and a memory communicatively coupled to a processor retrieves access information corresponding to an asset. The system stores one or more risk categories and one or more risk factors. The system determines the one or more risk categories corresponding to the access information and determines the one or more risk factors corresponding to the one or more risk categories. Based at least in part upon the one or more risk factors, the system calculates an access risk score for the asset. The system generates data visualization corresponding to the access risk score and the asset.

18 Claims, 3 Drawing Sheets

MONITORING SECURITY RISKS TO ENTERPRISE CORRESPONDING TO ACCESS RIGHTS AND ACCESS RISK CALCULATION

TECHNICAL FIELD

This invention relates generally to access rights and permissions to system assets, and more specifically to access risk calculation and monitoring.

BACKGROUND

Enterprises and financial institutions contain a plurality of computing systems and allow various users access to one or more resources of the computing system. Allowing users access to the resources presents a risk to the enterprise because the resources of the computing system may be tampered with or improperly accessed. Currently, access risk calculation and monitoring techniques are limited.

SUMMARY OF EXAMPLE EMBODIMENTS

According to embodiments of the present disclosure, disadvantages associated with access risk monitoring may be reduced or eliminated.

In certain embodiments, a system comprising an interface and a memory communicatively coupled to a processor retrieves access information corresponding to an asset. The system stores one or more risk categories and one or more risk factors. The system determines the one or more risk categories corresponding to the access information and determines the one or more risk factors corresponding to the one or more risk categories. Based at least in part upon the one or more risk factors, the system calculates an access risk score for the asset. The system generates data visualization corresponding to the access risk score and the asset.

Certain embodiments of the present disclosure may provide one or more technical advantages. In certain embodiments, a system for access risk monitoring automatically communicates a notification when a change in access rights to an asset of the system occurs, thereby conserving the computation resources necessary to manually perform a check for any changes in access rights.

In certain embodiments, a system for access risk monitoring generates data visualization corresponding to one or more access risk scores and one or more assets that allow a user to readily identify the highest value targets (e.g., those assets with the highest access risk scores) or assess the largest risk to the enterprise. This system conserves computational resources when comparing the various access risks scores.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a More Complete Understanding of the Present Invention and for Further Features and Advantages Thereof, Reference is Now Made to the Following Description Taken in Conjunction with the Accompanying Drawings, in which.

DETAILED DESCRIPTION

Figure 1:
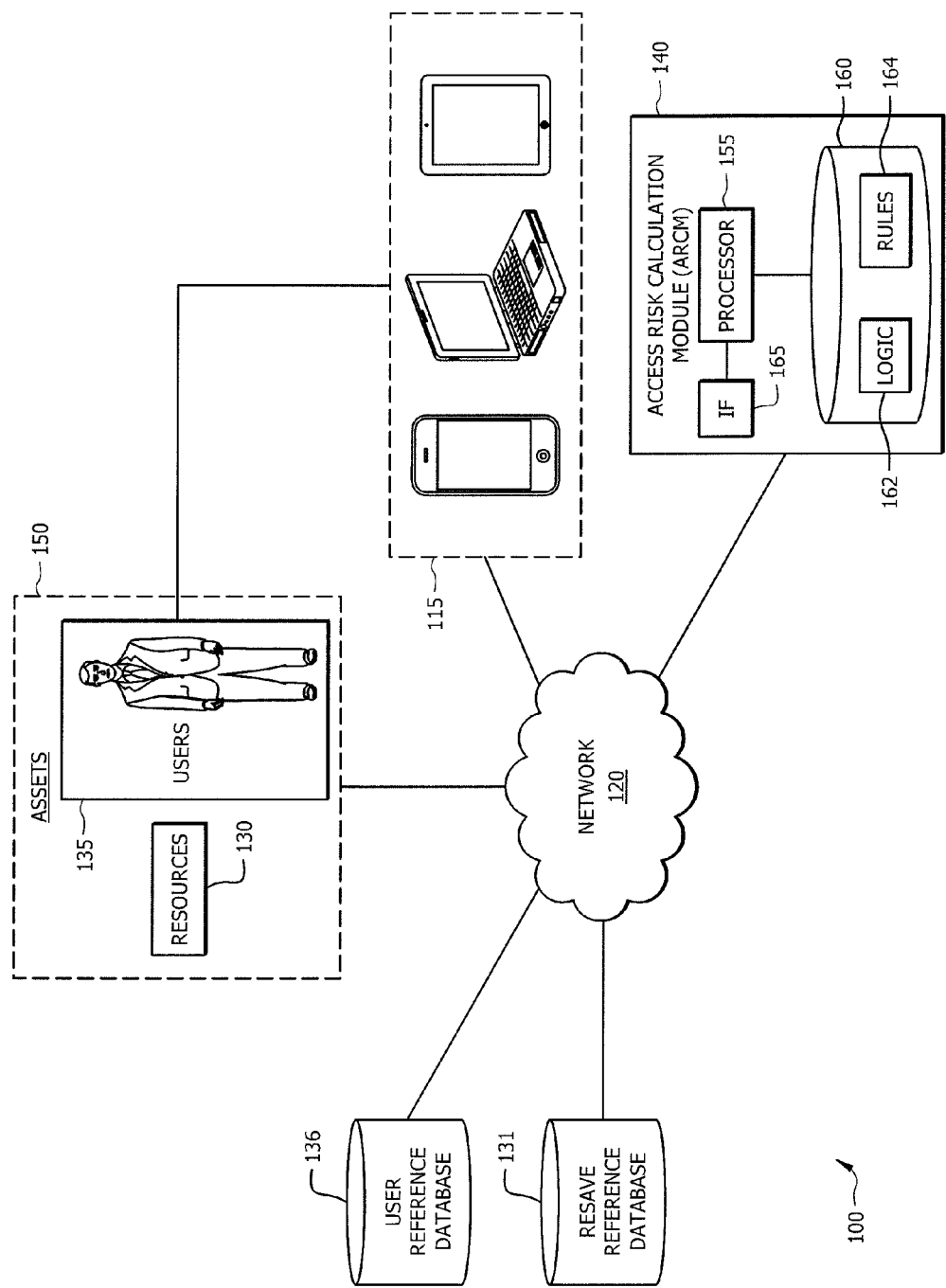
FIG. 1 illustrates an example of a system that facilitates access risk calculation and monitoring.
Figure 2:
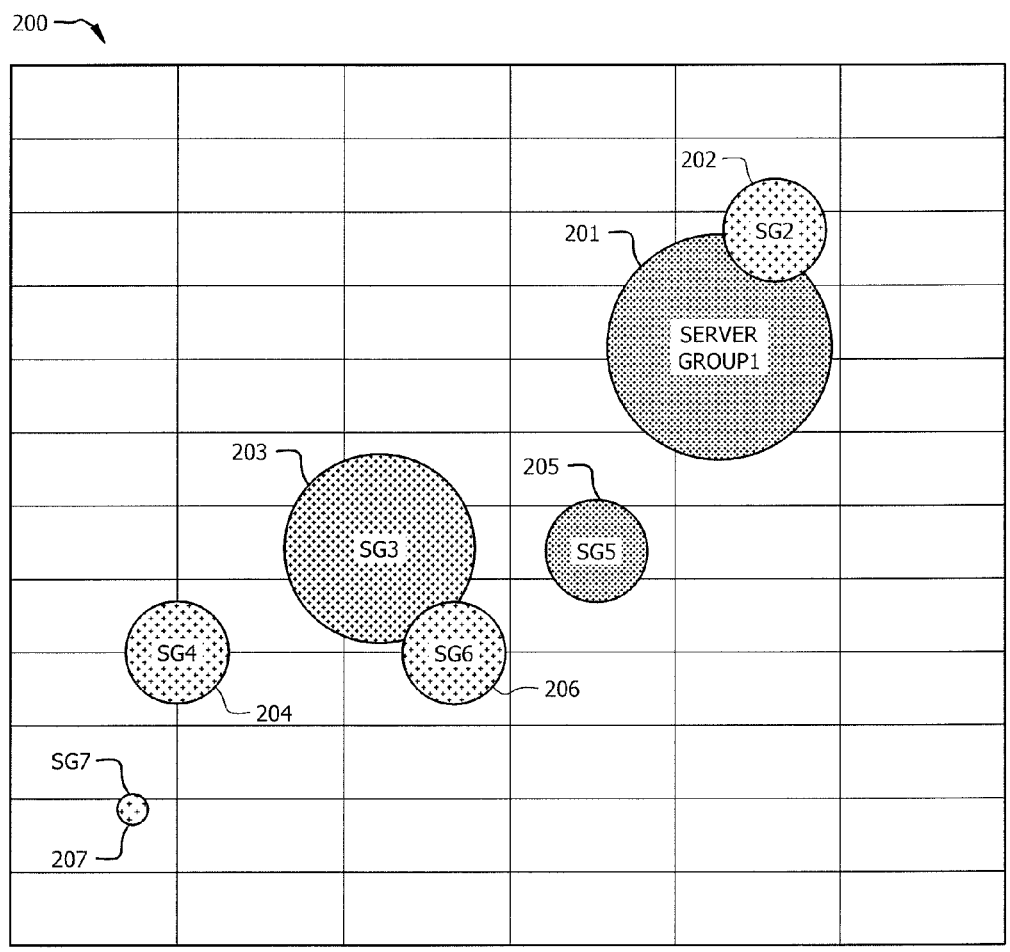
FIG. 2 illustrates an example data visualization in the form of a heat map corresponding to the access risk scores of a number of assets.
Figure 3:
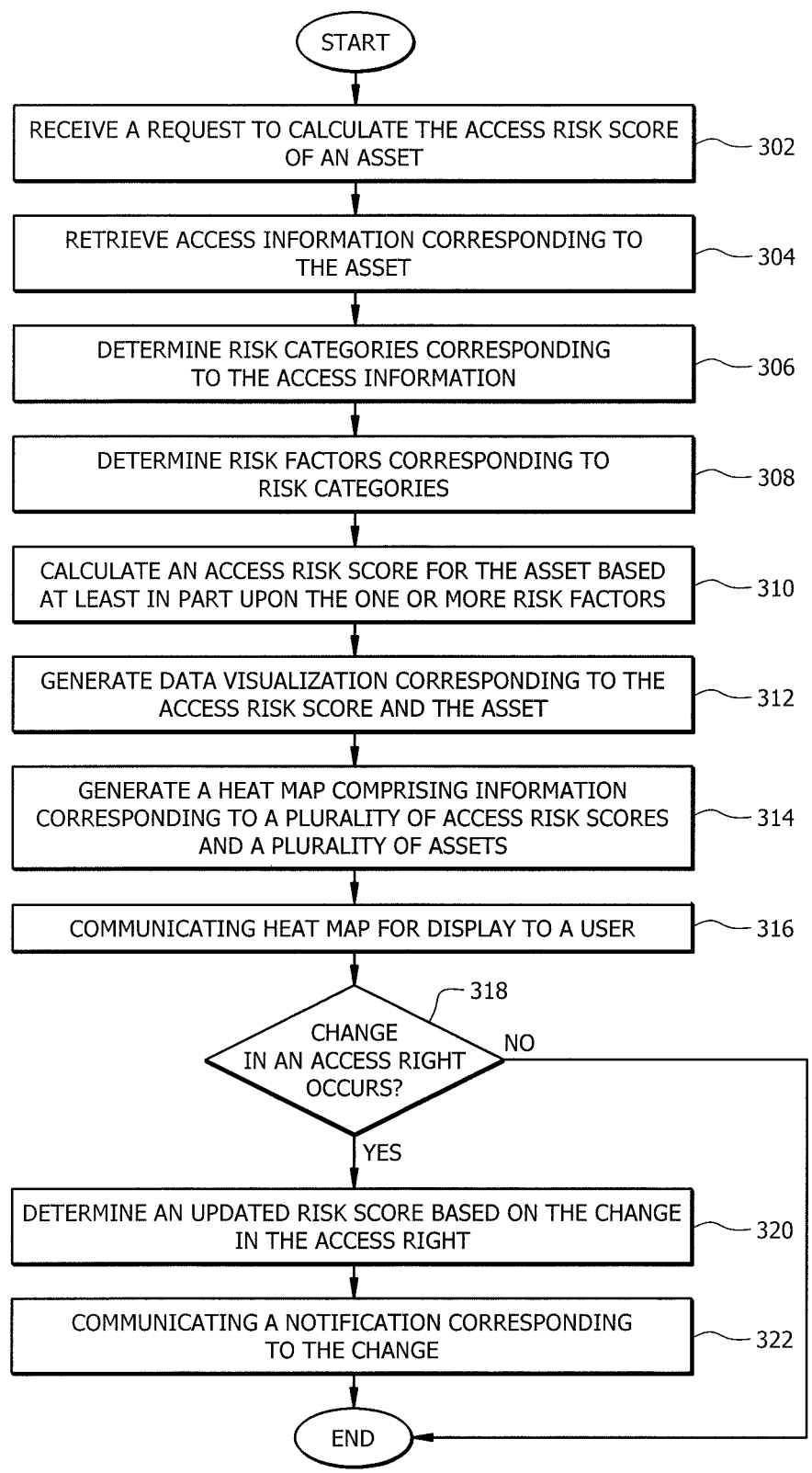
FIG. 3 illustrates an example flowchart for facilitating access risk calculation and monitoring.

Embodiments of the present invention and its advantages are best understood by referring to FIGS. 1-3, like numerals being used for like and corresponding parts of the various drawings.

Banks, business enterprises, and other financial institutions may contain various assets that facilitate serving their customers. The enterprise may include a plurality of users or employees that utilize a plurality of resources to provide the services to customers. The enterprise allows employees access to the plurality of resources, which may create a certain amount of risk in allowing users access to certain critical resources of the enterprise. Instead of determining which employees have access to a certain resource on an individual asset-by-asset basis, the teachings of this disclosure recognize that it would be desirable to monitor the level of access risk of users and computing resources across the entire enterprise to mitigate the risk of improper access to system resources and to provide a proactive method to determine that the correct access rights are given to users of the system.

FIG. 1 illustrates an example of system 100 that facilitates access risk calculation. System 100 may include one or more assets 150, one or more users 135, one or more user reference databases 136, one or more user devices 115, one or more resources 130, one or more resource reference databases 131, one or more networks 120, and one or more Access Risk Calculation Modules (ARCMs) 140. System 100 and its components may be within an enterprise or organization.

In general, access risk monitoring system 100 retrieves access information corresponding to asset 150. System 100 stores one or more risk categories and one or more risk scores in memory 160. System 100 determines one or more risk categories corresponding to the access information and determines one or more risk factors corresponding to the one or more risk categories. Based at least in part upon the one or more risk factors, system 100 calculates an access risk score for asset 150. System 100 generates data visualization corresponding to the access risk score and asset 150. The various components of system 100 communicate with one another over network 120.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Assets 150 are components that perform functions for an organization and may have certain risk involved with allowing access rights to the component. Assets 150 may be, for example, one or more users 135, a group of users 135, one or more team members, an operating system, a share, an application, a database, a server/node, or a server/node group. In some embodiments, assets 150 fall into one of two categories: resources 130 and/or users 135. Resources 130 are used by users 135 to carry out any suitable function of an organization. For example, in a banking organization, resources 130 may be servers used to facilitate ATM/Debit card transactions, provide access to customer accounts through online banking, facilitate automated stock trading, facilitate access and review of loan applications by the bank's employees, provide access to stock/fund information for investment opportunities, enable employees to access shared workspaces, any other suitable function, or any combination of the preceding.

Resources 130 may include a network server, any suitable remote server, a mainframe, a host computer, a workstation, a web server, a personal computer, a file, servers, printers, computers, server groups, applications, operating systems, databases, or any other device suitable for carrying out organizational functions. The functions of resources 130 may be performed by any suitable combination of one or more servers or other components at one or more locations. In an embodiment where resources 130 are servers, the servers may be public or private servers, and each server may be a virtual or physical server. A particular resource 130 may comprise multiple servers, which may be at the same location or at locations remote from one another.

Users 135 require access to resources 130 to perform certain functions, such as those listed above with respect to resources 130. Where appropriate, user 135 refers to a person that attempts to utilize resource 130 and in some embodiments, user 135 is an employee or administrator at the organization. User 135 may utilize one or more user devices 115 to access or utilize one or more resources 130. User device 115 may comprise a personal computer, laptop, wireless or cellular telephone, personal digital assistant, any of the devices listed as options for resource 102, any other device suitable for communicating information in system 100, and any suitable combination of the preceding. User device 115 may also comprise any suitable user interface such as a display, microphone, keyboard, or any other appropriate terminal equipment usable by user 135. It will be understood that system 100 may comprise any number and combination of user devices 115. In particular embodiments of system 100, a specific user 135 must have appropriate privileges to access a specific resource 130, which will be described in more detail below. User 135 utilizes user device 115 to interact with ARCM 140 to receive data visualizations corresponding to access risk scores and assets for display to user 135 or to receive a communication of a heat map for display to user 135, as described below.

Resource reference database 131 and user reference database 136 store information associated with users 135 and resources 130, respectively. For example, resource reference database 131 may be an application inventory system, a server inventory system, and a security tools and inventory system, which store information regarding resources 130. For example, resource reference database 131 may store information indicating that an application is a critical application of the enterprise, the server group(s) that a server is a part of, or whether there is a regulatory risk associated with resource 130. Similarly, user reference database 136 may be an authentication repository or a Human Resources (HR) system, which may store information indicating the access rights of a particular user 135. Additionally, user reference database 136 may store information indicating the various user groups of which user 135 is a part and the associated privileges with the user group. Resource reference database 131 and user reference database 136 may store any other suitable information. In an embodiment, this information may be modified. For example, when user 135 changes roles within an organization, user 135 may receive a higher access level, such as elevating to an administrative access level from an elevated access level. As another example, resource 130, such as a server, may be added to an additional server group or may be completely repurposed for a new function associated with a application. In such cases, the information stored in resource reference database 131 and user reference database 136 may be updated to reflect those changes. Where appropriate, resource reference database 136 and user reference database 131 comprise memory similar to that described below with respect to ARCM 140 memory 160.

ARCM 140 may refer to any suitable combination of hardware and/or software implemented in one or more modules to process data and provide the described functions and operations. In some embodiments, the functions and operations described herein may be performed by a pool of ARCMs 140. In some embodiments, ARCM 140 may include, for example, a mainframe, server, host computer, workstation, web server, file server, a personal computer such as a laptop, or any other suitable device operable to process data. In some embodiments, ARCM 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, ARCM 140 retrieves access information corresponding to asset 150 and determines one or more risk categories and related risk scores corresponding to the access information. Using the risk factors, ARCM 140 calculates an access risk score for asset 150 and generates data visualization corresponding to the access risk score and asset 150. In some embodiments, ARCM 140 may include processor 155, memory 160, and an interface 165.

Memory 160 may refer to any suitable device capable of storing and facilitating retrieval of data and/or instructions. Examples of memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates memory 160 as internal to ARCM 140, it should be understood that memory 160 may be internal or external to ARCM 140, depending on particular implementations. Also, memory 160 may be separate from or integral to other memory devices to achieve any suitable arrangement of memory devices for use in system 100.

Memory 160 is generally operable to store logic 162 and rules 164. Logic 162 generally refers to algorithms, code, tables, and/or other suitable instructions for performing the described functions and operations. Rules 164 generally refer to policies or directions for determining one or more risk categories corresponding to the access information of asset 150 and determining one or more risk factors corresponding to the one or more risk categories. Rules 164 may be predetermined or predefined, but may also be updated or amended based on the needs of the enterprise.

Memory 160 communicatively couples to processor 155. Processor 155 is generally operable to execute logic 162 stored in memory 160 to calculate an access risk score for asset 150 based at least in part upon the one or more risk factors according to the disclosure. Processor 155 may comprise any suitable combination of hardware and software implemented in one or more modules to execute instructions and manipulate data to perform the described functions for ARCM 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for ARCM 140, send output from ARCM 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system that allows ARCM 140 to communicate to other devices. Communication interface 165 may include any suitable software operable to access data from various devices such as user devices 115, user reference database 136, resource reference database 131, and resource 130. Communication interface 165 may also include any suitable software operable to transmit data to various devices such as user devices 115. Communication interface 165 may include one or more ports, conversion software, or both. In general, communication interface 165 may retrieve access information corresponding to asset 150 and communicate data visualization corresponding to the access risk score and asset 150 to user 135, such as an administrator of the enterprise.

In operation, logic 162 and rules 164, upon execution by processor 155, facilitate determining one or more risk categories corresponding to the access information of asset 150 and determining one or more risk factors corresponding to the one or more risk categories. Logic 162 and rules 140 also facilitate calculating an access risk score for asset 150 based at least in part upon the one or more risk factors and generating data visualization, such as a heat map, corresponding to the access risk score and asset 150.

In some embodiments, ARCM 140 retrieves access information corresponding to asset 150. ARCM 140 may retrieve access information corresponding to any type of asset 150 in order to run a query on asset 150. For example, ARCM 140 may retrieve the access information of a user, a group, team members, operating system, share, application, database, or server/node. ARCM 140 may retrieve the access information from user reference database 136, resource reference database 131, or directly from resource 130 itself. In some embodiments, the access information includes information about who may access resource 130 and information about resource 130 or user 135 itself. ARCM 140 may receive many types of access information depending on asset 150 and the nature of the enterprise. In some embodiments, the access information may include access type, access level, platform, application risk, application criticality, regulatory risk, environmental risk, and exposure surface. For example, if asset 150 is an application of the enterprise, which is a type of resource 130, then ARCM 140 may retrieve information including the application risk, the application criticality, the number of users 135 with access to the application, and the number of servers used to run the application.

In some embodiments, ARCM 140 determines one or more risk categories corresponding to the access information of asset 150. ARCM 140 may determine any number of risk categories, depending on asset 150 that the access information corresponds to, the nature of the enterprise, and the type of access information. For example, the risk categories for access information regarding the type or level of access that an individual user 135 has with regard to a certain resource 130 may include individual access, contractor access, system ID access, secured system ID access, or group access. One or more risk categories may be stored in memory 160 and ARCM 140 may reference these stored risk categories when determining the one or more risk categories corresponding to the access information of asset 150.

In some embodiments, ARCM 140 determines one or more risk factors corresponding to the one or more risk categories. In some embodiments, the risk factors may correspond to the amount of risk associated with the risk category, such as the risk factor increasing as the amount of risk associated with the category increases. For example, as the application has a higher criticality, the risk score increases: low criticality (1), medium (2), high (4). As another example, the risk categories of access type may have associated risk factors: individual access (1), contractor access (2), system ID access (4), secured system ID access (2), service ID access, secured service ID access, or group access (number of members in the group). Individual and contractor access may have lower risk factors because the access is associated with and directly tied to user 135, which makes the access less risky because the system trusts a particular user 135. Service IDs and system IDs are not directly tied to user 135 and thus have higher risk scores. Service IDs are tied to only one particular server and thus has a lower risk score than a system ID, which can span multiple servers and multiple infrastructures. If, however, the service ID or system ID is secured (i.e., user 135 has to check out the password on a person-by-person and use-by-use basis with the password changing each time it is checked out), then the risk factor is reduced (e.g., reduced from 4 to 2 for secured system ID and reduced from 8 to 4 for secured service ID).

In some embodiments, the specific risk categories and corresponding risk factors are configurable and may be updated or adjusted by system 100, user 135 (e.g., the administrator of the enterprise or system 100), or according to rules 164 of ARCM 140 depending on changes in security, business, or regulatory requirements. One or more risk factors may be stored in memory 160 and ARCM 140 may reference these stored risk factors when determining the one or more risk factors corresponding to the one or more risk categories of asset 150. Examples of risk categories and corresponding risk factors are shown in Table 1 below. These are meant to be only examples for some embodiments, and should not be construed as limiting.

TABLE 1

Examples of Risk Categories and Corresponding Risk Factors

| Access Information | Risk Categories | Risk Factors |
|---|---|---|
| Access type | Individual | 1 |
| | Contractor | 2 |
| | System ID (secured) | 4 (2) |
| | Service ID (secured) | 8 (4) |
| | Group | (# in group) |
| Access Level | Standard | 1 |
| | Elevated | 2 |
| | Administrative | 4 |
| Platform | Operating System | 1 |
| | Application | 2 |
| | Database | 4 |
| Application Risk | No Risk | 1 |
| | Low | 2 |
| | Medium | 4 |
| | High | 8 |
| | Significantly High | 16 |
| Application Criticality | Low | 1 |
| | Medium | 2 |
| | High | 4 |
| Regulatory Risk | No | 1 |
| | Yes | 2 |
| Environmental | Internal Network | 1 |

TABLE 1-continued

Examples of Risk Categories and Corresponding Risk Factors

| Access Information | Risk Categories | Risk Factors |
|---|---|---|
| Risk | Secure Demilitarized Zone (DMZ) | 2 |
| | Business to business DMZ | 4 |
| | Presentation DMZ | 8 |
| Exposure Surface | quantity of targets (number of services, applications, database instances) | quantity of targets |

In some embodiments, ARCM 140 calculates an access risk score for asset 150 based at least in part upon the one or more risk factors. ARCM 140 may calculate the access risk score for asset 150 using all or some of the determined risk factors. In some embodiments, ARCM 140 calculates the access risk score by aggregating the one or more risk factors. Aggregating the risk factors may include adding them all together, multiplying them all together, creating an average of all the risk factors, or any suitable way to create an overall access risk score. For example, for each applicable type of access information, ARCM 140 may multiply all of the risk factors to create an access risk score. Continuing the example and showing risk scores in parentheses, if an individual (1), has elevated access (2), to an application (2), the application being a medium risk application (4), the application having medium criticality (4), the application having no regulatory risk (1), and there are 100 instances of the application, then the access risk score would be 6,400 (1×2×2×4×4×1×1×100). If, instead, the asset is a group of twelve members rather than one individual, then ARCM 140 would use 12 as a multiplier and the access risk score would be 76,800 (12×2×2×4×4×1×1×100). As another example, ARCM 140 may calculate the access risk score of asset 150 by adding the risk factors. If an a group of ten members (10), has administrative access (4) to a database (2) containing an application with low risk (2) and high application criticality, then the access risk score would be 18. ARCM 140 may use the individual risk factors to calculate the access risk score for asset 150 in any number of ways. In some embodiments, when calculating the access risk score of a group of members, ARCM 140 may also calculate the access risk score for each user 135 in the group of members. By calculating the access risk score for each individual user 135, ARCM 140 facilitates rapid identification of excessive outlier access, for example if one user 135 of the group of members has an access risk score that is 100,000 higher than the rest.

In some embodiments, ARCM 140 generates data visualization corresponding to the access risk score and the asset. The data visualization may be a report, a heat map, an attestation report, a Security Information and Event Management (SIEM) alert, an email alert or notification, or any visual operable to show user 135 (e.g., administrator of system 100) the access risk scores of one or more assets 150.

In some embodiments, ARCM 140 may calculate the access risk score for a plurality of assets 150 and generate data visualization comparing the access risk scores. For example, ARCM 140 may generate a report showing the access risk scores for all users 135 in the IT systems group across the entire enterprise to ensure that their access risk scores are similar in scope. An administrator may utilize user device 115 to view the report, which allows the administrator to determine if team members have similar or broadly different access rights. The report generated by ARCM 140 may allow the administrator to click on user 135 to view one or more pieces of information related to the access risk score, such as each application user 135 has access to (and corresponding information regarding that application), the instances user 135 has accessed certain resources 140 (e.g., a certain server of the enterprise), and the risk factors and method of calculating the access risk score. In this example, the administrator may use the interactive report to determine how the access risk score of user 135 was calculated and to determine whether user 135 has access to certain resources 130 that user 135 should not have access to. By analyzing and generating data visualization for one or more users 135 or one or more groups of users 135, ARCM 140 facilitates an administrator easily assessing group permissions and rights to determine whether there is an overlap in access rights, and thus whether any consolidation in access rights is available. Another example of a type of data visualization may be a heat map, an example of which is shown in FIG. 2 and explained in more detail below.

In some embodiments, ARCM 140 determines a change in an access right corresponding to asset 150. ARCM 140 may constantly monitor system 100 for any changes in access rights, may check for any changes in access rights after a certain period of time (e.g., daily, weekly, monthly), or may check for changes in response to a request to do so. In certain embodiments, ARCM 140 communicates a notification corresponding to the change based at least in part upon the determination of the change in the access right. The notification may be an email to the administrator of system 100, a SIEM alert, a report, or a message received on user device 115 utilized by the administrator or user 135.

In certain embodiments, ARCM 140 may determine an updated access risk score based on the change in the access right. ARCM 140 may include the updated access risk score in the notification. For example, ARCM 140 may send an email to user 135 (e.g., the head of a group) saying that resource 130 has experienced a change in its access right and showing the new access risk score for resource 130. User 135 may view the email and determine whether the change in access right or updated access risk score poses any threat to system 100. In some embodiments, ARCM 140 may only communicate a notification corresponding to the change if the updated access risk score is changed by a certain amount or if it exceeds a threshold. For example, if the access risk score only changes by 1 point, then ARCM 140 may communicate a notification that a change occurred, but that it is not a threat. As another example, if the access risk score changes by 10,000, then ARCM 140 may communicate a high alert notification to the administrator of system 100 to ensure that the change is not a threat (i.e., a hacker changing the access rights so the hacker may access critical applications of the enterprise).

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of assets 150 (e.g., resources 130 or users 135), user devices 115, user reference databases 136, resource reference databases 131, networks 120, and ARCMs 140. As another example, particular functions, such as calculating an access risk score for asset 150, may be performed by a separate component and ARCM 140 receives the information regarding the access risk score. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 2 illustrates an example data visualization in the form of a heat map corresponding to the access risk scores of a number of assets. In this example heat map 200, circles 201-207 corresponding to server groups (SG1 through SG7) are shown. To generate heat map 200, ARCM 140 may retrieve access information corresponding to each server group, determine the risk categories and risk factors for each server group, and calculate an access risk score for each server group based at least in part upon the one or more risk factors. When generating heat map 200, ARCM 140 creates a circle for each asset 150, or in this example, each server group. ARCM 140 generates the size of the circle based on the exposure surface of asset 150, such as each server group. For server groups, the exposure surface would be the number of servers in the group. By corresponding the size of the circle to the number of servers in the group, heat map 200 is a visual that easily shows the biggest risk to an administrator viewing heat map 200 on user device 115. Heat map 200 shows a number of overlapping circles, for example circles 201 and 202 as well as circles 203 and 206. The overlap represents the individual servers that are in both server groups. For example, the overlapping section between circles 202 and 201 represents the individual servers in server group 1 and server group 2. The overlap may indicate to the administrator that these individual servers have an even higher access risk score because if they malfunction or fail, then two different server groups may be unable to function.

In certain embodiments, ARCM 140 colors or darkens the circle based on the calculated access risk score; the higher the risk score, the darker the circle. For example, circles 201 and 205 have the darkest coloring and thus server groups 1 and 5 have the highest access risk scores. Continuing the example, circle 203 has the next darkest coloring and thus server group 3 has the next highest access risk score; followed by circles 206, 202, and 204 (corresponding to server groups 6, 2, and 4, respectively) containing the same coloring and thus the same access risk scores; and circle 207 (server group 7) having the lightest coloring and thus the lowest access risk score. By generating heat map 200 and communicating it for display to user 135 on user device 115, ARCM 140 provides for rapid visual identification of the high risk target server groups for examination, remediation, or elevated monitoring purposes.

Modifications, additions, or omissions may be made to the systems described herein without departing from the scope of the invention. For example, although FIG. 2 illustrates a heat map, the data visualization corresponding to the access risk score of asset 150 that is generated by ARCM 140 may be any format to provide a visual of the risk. In some embodiments, the data visualization may be a report, a heat map, an attestation report, a SIEM alert, an email alert or notification, or any visual operable to show user 135 (e.g., administrator of system 100) the access risk scores of one or more assets 150. The components of ARCM 140 that generate the data visualization may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

FIG. 3 illustrates an example flowchart for facilitating access risk calculation. At step 302, in some embodiments, ARCM 140 receives a request to calculate the access risk score of asset 150. ARCM 140 may receive the request at interface 165 via network 120 from user device 115. User 135 may send the request utilizing user device 115. For example, user 135 may be an administrator of system 100 tasked with monitoring and analyzing the access risk scores of assets 150 of system 100. In some embodiments, the request may be for a particular asset 150 or a group of assets 150. For example, ARCM 140 may receive a request to calculate the access risk score of a particular user 135 or a particular resource (e.g., server, application). As another example, ARCM 140 may receive a request to calculate the access risk scores for each user 135 in a group of users 135 or each server in group of servers. In some embodiments, the request may also include a request to generate a certain type of data visualization. For example, ARCM 140 may receive a request to calculate the access risk scores for each server in a group of servers and generate a heat map so that user 135 (e.g., administrator) may be able to quickly discern the individual server with the greatest risk and largest exposure in the server group. In some embodiments, ARCM 140 may receive the request as a hypothetical scenario to determine what user 135's access risk would be if granted permission to access an additional resource 130. For example, an administrator may need to ensure that neither user 135's access risk or resource 130's access risk becomes to large when user 135 is granted access. This allows a group leader or administrator to ensure the addition access to user 135 would not jeopardize any resources 130 of system 100 before actually granting the access to the user.

At step 304, in some embodiments, ARCM 140 retrieves access information corresponding to asset 150. ARCM 140 may retrieve the access information using interface 165 via network 120. ARCM 140 may retrieve the information from user reference database 136, resource reference database 131, and/or the resource 130 itself. For example, ARCM 140 may retrieve access permissions and the level of permissions off of a server itself. In certain embodiments, types of access information may include access type, access level, platform, application risk, application criticality, regulatory risk, environmental risk, and exposure surface. ARCM 140 may retrieve all types of access information or only a few, depending on the type of asset 150 and the received request in step 302.

At step 306, in some embodiments, ARCM 140 determines one or more risk categories corresponding to the access information. For access information corresponding to the access level, the one or more risk categories may include standard, elevated, or administrative. A standard access level may be user 135 or a customer of the enterprise that can access the web page corresponding to a server. An elevated access level may include the ability to perform backups and restores of the server or to change the time on a server, but without the ability to change everything on a server. The administrative access may be the highest access that is able to perform any action to the server, and thus incorporates the highest amount of risk. As another example, access information corresponding to the platform of resource 130 may include an operating system, an application, or a database. These risk categories correspond to the level that a user may access. For example, the operating system will allow user 135 to simply utilize the application without being able to change anything about the application itself. By using the application platform, user 135 may alter or edit the application itself, or by accessing the database, user 135 may access the database corresponding to the application.

At step 308, in some embodiments, ARCM 140 determines one or more risk factors corresponding to the one or more risk categories. ARCM 140 may access memory 160 that, in some embodiments, may store values corresponding to each of the risk categories, for example, the values shown in Table 1. For example, the risk factor corresponding to the standard access level may be 1, while the risk factor corresponding to the administrative access level may be 4. ARCM 140 may also determine the risk factors each time it performs a query of asset 150. For example, the risk factors may vary and be constantly updated such that ARCM 140 needs to determine the risk factor at the particular moment the query is executing, rather than accessing a stored table in memory 160.

At step 310, in some embodiments, ARCM 140 calculates an access risk score for asset 150 based at least in part upon the one or more risk factors. ARCM 140 may calculate the access risk score for asset 150 using all or some of the determined risk factors. In some embodiments, ARCM 140 calculates the access risk score by aggregating the one or more risk factors. Aggregating the risk factors may include adding them all together, multiplying them all together, creating an average of all the risk factors, or any suitable way to create an overall access risk score. In some embodiments, when calculating the access risk score of a group of members, ARCM 140 may also calculate the access risk score for each user 135 in the group of members. By calculating the access risk score for each individual user 135, ARCM 140 facilitates rapid identification of excessive outlier access, for example if one user 135 of the group of members has an access risk score that is a certain threshold higher than the rest.

At step 312, in some embodiments, ARCM 140 generates data visualization corresponding to the access risk score and the asset. One example of the type of data visualization that ARCM 140 may generate is a heat map, explained below in steps 314 and 316. As another example, ARCM 140 may create an attestation report that shows users 135 their access risk scores and, if their score is high, requires them to validate or justify that the access risk score is necessary. For example, the report may be sent to all users 135 of a group showing the access risk scores of each individual user 135, the specific rights each user 135 has to particular resources 130, and the risk categories and corresponding risk factors that contribute to the access risk score of each user 135. Continuing the example, each user 135 may be required to validate (e.g., provide a written explanation, click a validation box) the access rights of user 135 to each resource 130 in the report. This would allow the manager of the group the ability to rapidly understand the total risk picture of the entire group and each individual user and, after receiving the attestations or validations from each user 135, determine whether any changes in access rights need to be made. By generating this type of attestation report, ARCM 140 allows the enterprise to take a proactive approach to ensure the access risk is reasonable and to limit the ability for user 135 to have too much access to any particular resource 130 of the enterprise. ARCM 140 may generate any type of data visualization to facilitate viewing the access risk scores of one or more assets 150.

At step 314, in some embodiments, ARCM 140 generates a heat map comprising information corresponding to a plurality of access risk scores and a plurality of assets. An example heat map 200 is shown and explained above in FIG. 2. ARCM 140 may generate a heat map for any number of assets 150. For example, ARCM 140 may generate a heat map for users 135 of a particular user group, such as the information technology (IT) group of the enterprise, which may be the group and users 135 with the highest access risk scores and the largest exposure area. At step 316, in some embodiments, ARCM 140 communicates the heat map for display to user 135 (e.g., administrator of system 100). By generating this heat map, the administrator is able to easily detect whether users 135 of the IT group have similar exposure areas (e.g., the size of their circles) and determine whether one user 135 has a much larger exposure area (and thus poses a larger risk) than the other users 135 in the IT group. Similarly, the administrator is able to easily detect whether users 135 of the IT group have similar access risk scores (e.g., the darkness of their circles) and determine whether one user 135 has a much higher risk score than the others in the group. The heat map allows the administrator to review the access risk scores of the group in an efficient and user-friendly way.

At step 318, in some embodiments, ARCM 140 determines a change in an access right corresponding to asset 150. ARCM 140 may determine a change based on access information retrieved from user reference database 136, resource reference database 131, or resource 130 itself. In some embodiments, ARCM 140 may perform this step without first receiving a request to calculate the access risk score of an asset, such as in step 302. Instead, ARCM 140 may constantly monitor the access information for all assets 150 in system 100 to determine when a change occurs. For example, ARCM 140 may run a query for asset 150 daily, weekly, bimonthly, monthly, or any other suitable timeframe, to determine whether there has been a change in access right. As another example, ARCM 140 may determine a change in an access right when the change occurs. For example, when user 135 is granted permission to access a new server, ARCM 140 may immediately determine a change was made based on the new permission to user 135. By being aware of any change in an access right, ARCM 140 is able to alert user 135 (e.g., an administrator of system 100) in order to avoid any issue or risk that may be related to user 135 gaining improper access to resource 130. If ARCM 140 determines there is no change in an access right, the method ends. If ARCM 140 determines in step 318 that there is a change in access right to asset 150, then the method continues to step 320.

At step 320, in some embodiments, ARCM 140 determines an updated access risk score based on the change in the access right. ARCM 140 may determine multiple updated access risk scores based on the change in access right. For example, if user 135 is added to a particular security team that has access to a server group, then ARCM 140 may update the access risk score for user 135, the security group as a whole, the server group as a whole, each individual server within the server group, and any of the applications being run by the servers within the server group. In some embodiments, ARCM 140 may compare the updated access risk score to a threshold to determine whether to send an alert in step 322, described below. For example, ARCM 140 may determine whether the updated access risk score (e.g., 16,120) is larger than a threshold (e.g., 10,000) and in response, may communicate an alert in step 322. As another example, ARCM 140 may determine the difference between the original access risk score and the updated access risk score and compare that difference to a threshold. In this example, ARCM 140 may determine the risk score jumped from 5,000 to 16,120 with a difference of 11,120 and may also determine this difference is greater than a threshold of 5,000, which may cause an alert. By focusing on the change in access risk score, ARCM 140 may be able to differentiate between small changes in permissions or access rights and much larger, more significant changes that may require review by a group leader or administrator.

At step 322, in some embodiments, ARCM 140 communicates a notification corresponding to the change based at least in part upon the determination of the change in the access right. In some embodiments, ARCM 140 may communicate the notification anytime there is any change in an access right. For example, once user 135 receives permission to access and edit an application, ARCM 140 may communicate a notification to an administrator requiring confirmation that this permission is proper and/or should be granted. In some embodiments, ARCM 140 may communicate a notification only when the updated access risk score of asset 150 is above a certain threshold or the difference is above a certain threshold, as described in step 320 above. The notification may take the form of one or more data visualizations generated in step 312 or may be an email or alert comprising information such as details regarding asset 150, user 135 who gained access to resource 130, the original access risk score, the updated access risk score, or any combination of the proceeding. By notifying user 135 (e.g., administrator) of a change in access rights and/or change in access risk score, ARCM 140 ensures that the access rights given to users 135 or allowed for resources 130 are proper and lessens the risk of hacking, malfunctions, or fraud. After communicating the notification, the method ends.

Modifications, additions, or omissions may be made to the methods described herein without departing from the scope of the invention. For example, the steps may be combined, modified, or deleted where appropriate, and additional steps may be added. In an embodiment where ARCM 140 engages in constant monitoring of one or more assets 150, then receiving a request to calculate the access risk score of asset 150 at step 302 may be omitted. As another example, steps 312 and 314, generating and communicating a heat map, may be omitted if ARCM 140 generates a different type of data visualization in step 312. Additionally, the steps may be performed in any suitable order without departing from the scope of the present disclosure. While discussed as ARCM 140 performing the steps, any suitable component of system 100 may perform one or more steps of the method.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An access risk calculation system, comprising:
    an interface that retrieves access information corresponding to a plurality of assets, the access information comprising access rights to the plurality of assets;
    a memory that stores one or more risk categories and one or more risk factors; and
    one or more processors communicatively coupled to the interface and the memory and that:
        determines the one or more risk categories corresponding to the access information;
        determines the one or more risk factors corresponding to the one or more risk categories;
        calculates a first access risk score for the plurality of assets based at least in part upon the one or more risk factors;
        generates data visualization corresponding to the first access risk score and the plurality of assets;
        determine a change in the access right corresponding to one or more assets of the plurality of assets;
        in response to determining the change in the access right, determine an updated access risk score for the plurality of assets based on the change in the access right;
        determine a difference between the first access risk score and the updated access risk score;
        determine whether the difference is greater than a threshold;
        in response to determining that the difference is greater than the threshold, create a notification indicating the change in the access right corresponding to one or more assets of the plurality of assets and that the change is above the threshold; and
    the interface communicates the notification for display.

2. The system of claim 1, wherein the plurality of assets comprise a selected one of a user, a group, one or more team members, a resource, an operating system, a share, an application, a database, a server, and a server group.

3. The system of claim 1, wherein calculating an access risk score comprises aggregating the one or more risk factors.

4. The system of claim 1, wherein:
    the one or more processors further generate a heat map comprising information corresponding to a plurality of access risk scores and the plurality of assets; and
    the interface further communicates the heat map for display to a user.

5. The system of claim 1, the interface further receives a request to calculate the access risk score of the plurality of assets.

6. The system of claim 1, wherein one of the plurality of assets is a user and:
    the one or more processors further generate an attestation report, the attestation report indicating a user access risk score for the user and the access rights for the user; and
    the interface:
        transmits the attestation report for display to the user; and
        receives an indication that the user validates the user access risk score and the access rights for the user.

7. A non-transitory computer-readable medium encoded with logic, the logic when executed to:
    retrieve access information corresponding to a plurality of assets, the access information comprising access rights to the plurality of assets;
    store one or more risk categories and one or more risk factors;
    determine the one or more risk categories corresponding to the access information;
    determine the one or more risk factors corresponding to the one or more risk categories;
    calculate a first access risk score for the plurality of assets based at least in part upon the one or more risk factors;
    generate data visualization corresponding to the first access risk score and the plurality of assets;
    determine a change in the access right corresponding to one or more assets of the plurality of assets;
    in response to determining the change in the access right, determine an updated access risk score for the plurality of assets based on the change in the access right;
    determine a difference between the first access risk score and the updated access risk score;
    determine whether the difference is greater than a threshold;

in response to determining that the difference is greater than the threshold, create a notification indicating the change in the access right corresponding to one or more assets of the plurality of assets and that the change is above the threshold; and communicate the notification for display.

8. The computer-readable medium of claim 7, wherein the plurality of assets comprise a selected one of a user, a group, one or more team members, a resource, an operating system, a share, an application, a database, a server, and a server group.

9. The computer-readable medium of claim 7, wherein calculating an access risk score comprises aggregating the one or more risk factors.

10. The computer-readable medium of claim 7, wherein the logic further:

generates a heat map comprising information corresponding to a plurality of access risk scores and the plurality of assets; and communicates the heat map for display to a user.

11. The computer-readable medium of claim 7, wherein the logic further receives a request to calculate the access risk score of the plurality of assets.

12. The computer-readable medium of claim 7, wherein the logic further:

generates an attestation report, the attestation report indicating a user access risk score for the user and the access rights for the user;

transmits the attestation report for display to the user; and receives an indication that the user validates the user access risk score and the access rights for the user.

13. An access risk calculation method, comprising:

retrieving access information corresponding to a plurality of assets, the access information comprising access rights to the plurality of assets;

storing one or more risk categories and one or more risk factors;

determining, using a processor, the one or more risk categories corresponding to the access information;

determining, using the processor, the one or more risk factors corresponding to the one or more risk categories;

calculating, using the processor, a first access risk score for the plurality of assets based at least in part upon the one or more risk factors;

generating, using the processor, data visualization corresponding to the first access risk score and the plurality of assets;

determining, using the processor, a change in the access right corresponding to one or more assets of the plurality of assets;

in response to determining the change in the access right, determining, using the processor, an updated access risk score for the plurality of assets based on the change in the access right;

determining, using the processor, a difference between the first access risk score and the updated access risk score;

determining, using the processor, whether the difference is greater than a threshold;

in response to determining that the difference is greater than the threshold, creating, using the processor, a notification indicating the change in the access right corresponding to one or more assets of the plurality of assets and that the change is above the threshold; and communicating the notification for display.

14. The method of claim 13, wherein the plurality of assets comprise a selected one of a user, a group, one or more team members, a resource, an operating system, a share, an application, a database, a server, and a server group.

15. The method of claim 13, wherein calculating an access risk score comprises aggregating the one or more risk factors.

16. The method of claim 13, wherein generating data visualization comprises:

generating, using the processor, a heat map comprising information corresponding to a plurality of access risk scores and the plurality of assets;

communicating the heat map for display to a user.

17. The method of claim 13, further comprising receiving a request to calculate the access risk score of the plurality of assets.

18. The method of claim 13, wherein one of the plurality of assets is a user and, the method further comprising:

generating, using the a processor, an attestation report, the attestation report indicating a user access risk score for the user and the access rights for the user;

transmitting the attestation report for display to the user; and receiving an indication that the user validates the user access risk score and the access rights for the user.

* * * * *